United States Patent Office 3,189,527
Patented June 15, 1965

3,189,527
BIOSYNTHETIC PROCESS FOR MAKING
CITRIC ACID
Lewis Byford Lockwood and Mario Alexander Batti,
Elkhart, Ind., assignors to Miles Laboratories, Inc., Elkhart, Ind., a corporation of Indiana
No Drawing. Filed Nov. 7, 1963, Ser. No. 322,064
8 Claims. (Cl. 195—36)

This invention relates generally to the production of citric acid by fermentation of carbohydrate-containing media with citric acid-producing organisms in submerged culture, and is particularly concerned with a fermentation process wherein the components of the fermentation media or cultures are not required to be highly purified, whereby a considerable saving may be realized in the cost of raw materials used in the process.

In the following description, the invention will be described in relation to fermentations using *Aspergillus niger* as the fermenting organism, but it is to be understood that the invention is not limited thereto, but is applicable also to fermentations with other species of Aspergillus, such as *Aspergillus phoenicis* and *Aspergillus japonicus*, as well as various species of Penicillium which are capable of producing citric acid.

Under the conditions prevailing in processes for producing citric acid by fermentation with *Aspergillus niger* in submerged culture, the presence of the fermentation media of certain impurities, even in very small amounts, may affect the metabolism of the organism in such a way that the organism preferentially produces mycelium of inferior citric acid-producing capacity, with the result that the production of citric acid is adversely affected, and may even be entirely inhibited.

The most important source of such impurities is the carbohydrate material used in preparing the fermentation media, when unrefined or only partially refined carbohydrate materials are used for this purpose. The deleterious effects of the impurities may therefore be avoided, or substantially avoided, by using highly purified carbohydrate materials as the organic nutrient components of the fermentation media. The use of purified water as the vehicle in such media is a further means of minimizing undesirable impurities in the fermentation environment. However, the use of pure materials, whether they are initially purchased in the pure form or are purchased in the crude form and then refined to the requisite degree of purity in the plant of the person practicing the fermentation process, entails considerable expense, and therefore citric acid produced by such methods usually may not be priced competitively with citric acid produced by other commercial processes, such as the commonly used surface fermentation methods. It is therefore necessary, in any commercially attractive process for producing citric acid in submerged culture, that the carbohydrate component of the fermentation medium be either in the crude form or only partially refined, so that the ultimate market price of the final product is not raised prohibitively by refining costs of the raw material.

One of the impurities which, when present in the fermentation medium in more than minimal amounts, has the above mentioned deleterious effect on the metabolism of *Aspergillus niger* under the conditions employed in submerged fermentation, is iron. Other impurities present in crude or partially refined carbohydrate materials, such as molasses, have been designated as a group as "iron potentiators" and are believed to be amino acid moieties, partial enzyme systems, intermediate metabolites, and the like. These iron potentiators are believed to function in a way which enhances the action of the iron in the medium in promoting a cellular metabolism of the *Aspergillus niger* which favors production of mycelium of inferior citric acid-producing capacity.

The aforementioned deleterious effects of the impurities in submerged fermentations are fully discussed in U.S. Patent No. 2,970,084 to Leonard B. Schweiger, which discloses that such deleterious effects may be avoided by providing copper in ionic form in the fermentation medium before or during the period after inoculation when the fermenting organism is obtaining its growth, i.e., during the initial period of about 50 hours after inoculation. In the technique of the Schweiger patent, the ionic copper appears to exert an antagonistic effect toward the iron and to alter the enzyme system of the *Aspergillus niger*, whereby the organism perferentially utilizes the carbohydrate for the production of citric acid rather than in building mycelium.

We have found that fermentations with *Aspergillus niger*, in submerged culture, of media containing impurities in an amount normally effective to prevent efficient production of citric acid may be successfully conducted, and that the advantages obtainable with the above mentioned Schweiger process may be achieved, by incorporating in the fermentation medium during the initial growth period of the *Aspergillus niger*, that is during the initial period of about 50 hours after inoculation (or more specifically, the initial period of about 40–50 hours after inoculation, since the time taken by *Aspergillus niger* to obtain its growth is dependent somewhat on the fermentation conditions, such as temperature and pH of the medium), a toxic organic agent for the *Aspergillus niger*. In practicing our process the organic addition agent is used in the medium in an amount which is toxic to the organism, but in sub-lethal concentration (i.e., in a concentration less than that which will kill the organism).

The toxic nature of the organic agents useful in the present invention is characterized by interfering with the activity of one or more of the respiratory enzymes of the cells of the organism, thus altering its metabolism.

An object of the invention is to provide a novel method of producing citric acid in high yield by submerged fermention with *Aspergillus niger*, wherein the carbohydrate material used in preparing the medium is derived from an impure source and contains impurities in an amount effective normally to promote, during fermentation, a cellular metabolism of the *Aspergillus niger* favoring production of at least some mycelium of inferior citric acid-producing capacity.

An additional object is to effect a successful fermentation of impure carbohydrate material with *Aspergillus niger* in submerged culture to produce citric acid in high yield by employing a toxic organic agent for *Aspergillus niger* in the fermentation medium in sub-lethal concentration to overcome the deleterious effects of naturally occurring impurities on the cellular metabolism of the organism.

Other objects and advantages of the invention will in part be obvious, and will in part appear in the following description wherein a presently preferred mode of practicing the invention is set forth:

As noted above, the present invention is applicable specifically to fermentation processes wherein the carbohydrate component of the fermentation medium is obtained from an impure source, such as glucose, starch hydrolyzates, invert sugars, aqueous vegetable extracts containing sugar, and partially or incompletely refined sucrose. Examples of commercially available carbohydrate-containing materials which are contemplated as raw materials for the present process include the various corn sugars, beet sugar, beet sugar molasses, potato sugar, various vegetable extracts such as corn syrup, high test syrup, beet juice, pineapple juice, beet diffusion liquors and the like, and partially refined sucrose such as brown sugar, affination sugar, etc. High test cane syrup is the preferred carbohydrate source.

The cellular morphology of *Aspergillus niger* characterized by inferior citric acid-producing capacity, and the morphology which is capable of efficiently converting carbohydrates to citric acid, are both shown and described in United States Patent No. 2,492,667, and are also briefly described in the above mentioned Schweiger patent. The morphology characterized by efficient citric acid-producing capacity is of restricted growth and characterized by: (a) abnormally short, stubby, forked, bulbous mycelium; (b) numerous swollen, oval to spherical-shaped cells (chlamydospores) well distributed throughout the mycelial structure; (c) mycelial structures all showing granulation and numerous vacuoles or refractile bodies; (d) absence of normal reproductive bodies (vesicles or sterigmata); (e) formation of compact aggregates or colonies having gross granular appearance.

The cellular morphology of mycelium of *Aspergillus niger* having inferior citric acid-producing capacity, is characterized by long slender filaments on which long slender branches occur as distinguished from the short, stubby, stunted branches characteristic of the desirable mycelial growth. The mycelium is diffuse, not in compact aggregates, and frequently looks superficially like wet cotton. The protoplasm is typically hyaline, with little or no granulation, and chlamydospores are very scarce or absent.

The relative citric acid-producing capabilities of the two forms of mycelium described above are shown below in Examples 1 and 2.

Examples 1 and 2

"Dominno" brand refined crystalline sugar was dissolved in distilled water, and the resulting solution was acidulated with $H_2SO_4$ to pH 1.78 to 1.8, heated to 42° C., and passed at a flow rate of 200 ml. per minute through a Dowex 50 cation exchange resin bed 2" in diameter and having a resin volume of 0.05 cubic foot. Electrical resistance of the effluent was 178 to 181 ohms. There was added to the effluent 0.1% $MgSO_4 \cdot 7H_2O$ (USP), 0.015% $KH_2PO_4$ (USP), 0.01% calcium (supplied as $CaCl_2$—USP grade), 0.004% KCl (USP), and $NH_4OH$ to pH 3.1. The resulting solutions were sterilized at 15 to 18 pounds steam pressure for five to eight minutes, then cooled to room temperature.

Two four-liter portions of the solution were placed in standard laboratory fermentation columns, and to one of such portions 0.75 part per million (p.p.m.) of iron was added as a soluble salt. Both portions were inoculated with spores of *Aspergillus niger*, then incubated at 86° F., and aerated at six to seven liters air per minute. After three days, seventeen hours, samples were taken for analysis and examination by microscope. Each culture contained initially 823 grams sugar, inverted and calculated as invert sugar. The results of the fermentations are shown in the following table:

| Example | Citric acid produced, g. | Invert sugar consumed, g. | Citric acid yield percent of theory based on invert sugar consumed | P.p.m. iron added |
|---|---|---|---|---|
| 1 | 100 | 98 | 87.0 | 0 |
| 2 | 17 | 75 | 19.4 | 0.75 |

In Examples 1, in which the sugar was converted at high efficiency to citric acid, the mycelium formed was of the desirable type described above.

In Example 2, above, wherein only a small proportion of the sugar consumed was converted to citric acid, the mycelium formed was of the undesirable type described above.

The cation-exchange resin "Dowex 50" is the tradename of a strongly acidic synthetic cation-exchange resin of styrene-divinylbenzene co-polymer type with molecular sulfonic acid as the functional groups, sold by Dow Chemical Company. This cation-exchange resin is one which operates on the hydrogen cycle, i.e., in the decationization process the resin exchanges hydrogen ions for the cations contained in the solution being treated.

When defining mycelial structure herein, and in the claims, the term "efficient citric acid-producing mycelium" and the term "inferior citric acid-producing mycelium" refer respectively to the aforedescribed morphology characteristic thereof. It is to be understood, of course, that the invention is not limited to the production of mycelium of the precise morphology characteristic of the efficient type aforedescribed by employing the teachings of the present invention, one may obtain a mycelial structure somewhat more filamentous than the preferred structure but which would still be capable of producing citric acid in reasonably good yield which may be acceptable to the person practicing the process.

In order to use the present invention to advantage it is not necessary that the fermentation medium contain the undesirable impurities in an amount which would normally (i.e., in the absence of the toxic organic addition agent) result in the production entirely of the filamentous, loose and diffuse mycelium described above. For example, the composition of a fermentation medium may be such that both the desirable form and undesirable form of mycelium are produced, and a considerable amount of citric acid may be formed in the fermentation. In such case, the efficiency of conversion of sugar to citric acid would be improved if the proportion of the desirable form of mycelium were increased and the proportion of the undesirable form correspondingly reduced these changes being obtainable by the addition of a toxic organic addition agent to the fermentation medium, in accordance with the invention. Accordingly, the invention may be used to improve the yield of citric acid in a submerged fermentation in which a considerable amount of citric acid would normally be produced. Broadly speaking, therefore, the present invention may be used to advantage in fermentation wherein the impurities are present in the medium in an amount effective normally to promote a cellular metabolism of the *Aspergillus niger* favoring production of at least some of the undesirable, loose, filamentous mycelium described above.

The difference in cellular morphology associated with efficient and inferior citric acid-producing capabilities provides a convenient fermentation control measure for determining the necessary additions of the toxic organic agent to any fermentation medium in accordance with the invention, as will be described hereinafter.

The morphology and metabolic system of the *Aspergillus niger* are established during the above mentioned initial growth period of about 50 hours immediately following inoculation of the medium with spores of the organism. Therefore, the entire amount of the toxic organic addition agent required for counteracting the undesirable effects of the impurities in the medium should be added thereto during this period of initial growth of the organism. Preferably, the toxic agent is incorporated into the medium concurrently with the inoculation thereof with spores of the fermenting organism, or even before such inoculation. However, incorporation of the organic addition agent in the medium after inoculation, but still within the above mentioned initial growth period, may still be effective to cause the growth to efficient citric acid-producing mycelium, although the quantity of the organic addition agent required for producing the desired mycelial growth in a given medium increases as the fermentation proceeds.

In practicing the invention commercially it is preferable to run a number of preliminary laboratory-scale trials with the medium which will be used in the commercial fermentation to determine the amount or organic toxic agent needed to bring about the desired citric acid-producing growth of the organism. In such preliminary runs, one trial is operated as a control while in the other trial fermentations different quantities of the organic toxic agent are incorporated in the media in the respective fermentors. From the characteristics of the cell structure developed by the organism in about the first 50 hours of such respective fermentations, and from the reaction efficiencies shown in the respective trials as determined by the amount of citric acid produced therein, the amount of organic toxic addition agent which will be operative in the large scale commercial fermentation is clearly indicated. Also, since such fermentations in commercial practice are usually repetitive, the concentration of the toxic organic addition agent used in a previous successful fermentation provides an accurate basis for determining the amount of the agent to be added in succeeding fermentations using the same medium.

Since in commercial fermentation operations the carbohydrate raw material (for example high test cane syrup) is purchased in very large quantities, and consequently the characteristics of the carbohydrate material used in preparing the fermentation media remains substantially constant over long periods of time, the above mentioned preliminary trial fermentations are usually necessary only when a new contract supply or source of the carbohydrate raw material is received.

As will appear hereinafter, a great many organic compounds may be used as the addition agents in the present process. It will of course be understood that the toxicities of the various toxic organic addition agents toward the fermenting organism differ considerably from one another and that accordingly, some of such organic addition agents must be used in greater concentration than others to produce an equivalent effect on the metabolism and cell development of the *Aspergillus niger* under given conditions in a fermentation. However, whichever toxic organic addition agent is intended to be used, its operative concentration in the fermentation medium for producing the proper citric acid-producing cell structure is readily determined by running a series of laboratory trial fermentations with different concentrations of the organic addition agent, and then observing the cell structure developed by the organism and the amount of citric acid produced, as described above.

In the preferred practice of the invention, the toxic organic addition agent is incorporated in the fermentation medium at the time of inoculation of the medium with spores of *Aspergillus niger* and, as has been noted above, the results of the preliminary trial fermentations and any preceding commercial-scale fermentations provide a dependable criterion for estimating very closely the amount of the organic addition agent required initially to condition the medium for satisfactory fermentation. If too little of the toxic organic addition agent is added in the first instance, further additions thereof may be made as the fermentation progresses, to bring about the desired change in the growth and cellular metabolism of the organism. However, as previously noted the influence of the toxic organic addition agent on the metabolic activities of *Aspergillus niger* in affecting its morphology is manifested most readily during the initial growth period of the organism (i.e., the period of about 50 hours immediately following inoculation) and, accordingly, the growth of the organism should be examined at suitable intervals, e.g., intervals of about 12 hours, during the initial growth period to ascertain whether growth is progressing as desired and, if not, a further addition of the toxic organic addition agent should be made. For example, if after about 12 hours after inoculation, examination of the organism shows its mycelium to be loose and filamentous, without short and stubby branches, with few or no chlamydospores, and looking superficially like wet cotton, a further addition to the toxic organic addition agent is indicated. About 12 hours after such second addition of the toxic organic addition agent, a further microscopic examination of the organism is made and, if the cellular structure does not show the desired short, stubby, forked, bulbous mycelium (and other characteristics of the efficient citric acid-producing structure aforementioned) a still further addition of the toxic organic addition agent is made. Further such examinations and if necessary, further additions of the toxic addition agent, may be made during the initial period of about 50 hours after inoculation during which the growth of the organism and its characteristics are determined. A mycologist familiar with the desired cell structure, as defined above, knowing the above mentioned effect of the toxic organic agents on the cell structure, and knowing also the above mentioned influence of impurities in the medium and the effect of elapsed time between spore inoculation and addition of the organic agent, would have no difficulty in determining the necessary additions of the toxic organic agent to carry out a successful fermentation.

In another procedure for determining the amount of the toxic agent to add to a given fermentation medium in accordance with the invention, the weight of mycelium produced in the early stages of fermentation is determined. This procedure is based on the fact that, under conditions which promote a metabolism of the *Aspergillus niger* favoring production of mycelium of poor citric acid-producing capacity, more mycelium is produced than when the fermentation conditions promote a metabolism favoring production of mycelium of good citric acid-producing capacity. We have found that in an efficient citric acid-producing fermentation the amount of mycelium produced will, when measured five days after inoculation, vary between about 5 and about 20 grams per liter of fermentation medium, as oven-dry weight (i.e., when dried at about 60° C. under gauge vacuum of about 25 inches of mercury for 16 hours). Accordingly, in the practice of the present invention the amount of toxic organic agent added to the fermentation medium is such that the quantity of mycelium produced in the first five days after inoculation of the medium with spores of *Aspergillus niger* is between about 5 and about 20 grams per liter of medium, measured as oven-dry weight.

It is sometimes necessary or desirable to subject certain impure sugar solutions to a preliminary defecation and decationization treatment to reduce the ash components and colored impurities in order to produce a purer final product. Such preliminary treatment of course removes part of the iron and a considerable portion of the "iron potentiators" present in the original sugar supply. However, such preliminary defecation and decationization treatments do not remove all the iron or iron potentiators from the sugar solution, and the small amounts of iron and other impurities which remain are sufficient, acting together, to render such pre-treated sugar solutions unsuitable, without the addition of a suitable agent such as the above mentioned toxic organic agent, for use in submerged fermentations. The process of the invention, therefore, retains its commercial value even in those instances where the carbohydrate raw material is given a defecation and decationization treatment, short of substantially complete refining, prior to its incorporation in the fermentation medium.

In the examples below in which defecated cane syrup was used in preparing the fermentation media, the crude syrup was defecated in accordance with the following procedure: to one gallon of a crude cane syrup of about 40% sugar content is added 2.84 grams of commercial phosphoric acid (85%). The solution is then limed to pH 7.5. Suspended solids (filter aids, calcium phosphate, and colloidal impurities which cause cloudiness in crude sugar syrups) are filtered off, and the clear supernatant is used for further processing. Other known defecation methods may be used for treating impure carbohydrate solutions for use in this invention.

Where decationization is referred to in the examples below, the decationization was performed in accordance with the following procedure: one-tenth of a cubic-foot of "Dowex 50" resin is introduced into a vertical tube or column having a 2-inch diameter, to form a bed of the resin. The carbohydrate solution (e.g., diluted high-test cane syrup) is then poured into the column and allowed to flow by gravity through the resin bed, the effluent being collected as it flows from the bottom of the bed. The pH of effluent flowing from the resin bed remains constant until the cation-exchange capacity of the bed becomes nearly exhausted, at which time the pH of the effluent begins to rise. In the following examples employing decationized carbohydrate material, only effluent from the cation-exchange bed which was collected before the pH begins to rise was used in the fermentations.

Other cation-exchange resins may of course be used for the decationization of the solutions of the carbohydrate materials.

All media used in the procedures of the examples below were sterilized, prior to inoculation, in a steamjacketed autoclave by introducing steam at 40 pounds per square inch gauge (p.s.i.g.) into the autoclave through a reducer until the steam pressure in the autoclave rises to 20 p.s.i.g., then allowing the contents to cool to near room temperature. Other suitable sterilizing procedures may of course be employed.

The strain of *Aspergillus niger* used in the fermentations of the following examples was that designated Miles Chemical Company mutant 139, which was an ultraviolet-ray induced mutant of a wild strain, and was a true *Aspergillus niger* as described generally at page 214 et seq. in "Manual of the Aspergilli," by Thom and Raper, published by Williams & Wilkins (1945), and specifically described at page 216 thereof. It is to be understood of course that the invention is not limited to submerged fermentations by the above mentioned specific strain of *Aspergillus niger* but, rather, that the technique of the invention is applicable to submerged fermentations using any citric acid-producing strain of *Aspergillus niger*. Furthermore, the present process is not limited in its application to submerged fermentations by *Aspergillus niger*, but is applicable as well to submerged fermentations by all citric acid-producing species of the Aspergilli, as well as to submerged fermentations yielding citric acid by citric acid-producing species of Penicillium.

The fermentations described in the examples below were conducted in vertical glass cylinders four inches in diameter and 48 inches long, having stainless steel end plates. The upper end plate is provided with an exhaust air outlet and an inlet conduit for introducing additives to the culture medium, and the lower end plate includes a conduit for introducing air into the cylinder. The inner end of the conduit in the lower end plate is connected to a horizontally disposed X-shaped sparger adjacent the bottom of the cylinder, each arm of which has on its underside and near its end an aperture of about one-sixteenth inch diameter through which air is introduced into the cylinder for aeration and agitation of the culture. Obviously, other conventional apparatus for submerged culture fermentation may also be used, if desired.

The invention is illustrated in the following examples wherein the presently preferred mode of practicing the improved process is set forth. It is to be understood that the examples are illustrative only and that changes in the techniques, compositions, percentages, conditions and other factors set forth may be made without departing from the spirit of the invention as defined in the appended claims.

*Example 3*

A nutrient solution was prepared from defecated, decationized, high-test cane syrup (concentrated cane juice, about 70% inverted) having a sugar concentration of 20.52% (w./v.), to which was added 140 parts per million (p.p.m.) $KH_2PO_4$, 1,000 p.p.m. $MgSO_4 \cdot 7H_2O$, 0.3 p.p.m. $Cu^{++}$ (added as $CuSO_4$) and 0.3 p.p.m. $Zn^{++}$ (added as $ZnSO_4$), and the acidity of the resulting solution adjusted to pH 2.78 with ammonia. The solution was then sterilized and allowed to cool to about room temperature. Two 4-liter cultures of *Aspergillus niger* using this solution were aerated with five liters of air per minute, while maintaining the temperature of the cultures at about 30° C. To one culture 30 p.p.m. of commercial cresylic acid (crude coal tar distillate containing primarily cresols and xylenols) were added at the time of inoculation of the nutrient solution with the fermenting organism. The remaining culture was not modified by the addition of the cresylic acid. After 8 days and 22 hours, the fermentation of the culture without cresylic acid had produced 218 g. of citric acid, while the fermentation with the added cresylic acid had produced 310 g. citric acid. The addition of the cresylic acid to one of the cultures thus resulted in an increase in citric acid production of about 42%, when compared to the control.

*Example 4*

Glucose syrup made by hydrolysis of the starch of ground milo was defecated and filtered, and found to contain 20.28% (w./v.) glucose. This sugar solution was decationized by passage through a bed of Dowex 50 resin, the acidity of the decationized solution was adjusted to pH 2.75 with ammonium carbonate, and 140 p.p.m. $KH_2PO_4$, 1,000 p.p.m. $MgSO_4 \cdot 7H_2O$, 0.2 p.p.m. $Cu^{++}$ (added as copper sulfate) and 0.2 p.p.m of $Zn^{++}$ (added as zinc sulfate) were added thereto. The solution was then sterilized and allowed to cool to about room temperature. Two 3800 ml. *Aspergillus niger* cultures in this solution were aerated with air at the rate of five liters per minute, while maintaining the temperature thereof at about 30° C. Fifty p.p.m. commercial cresylic acid was added to one of the cultures at about the time of its inoculation, while the remaining culture was not modified by such cresylic acid addition. After 13 days, 18 hours, the culture without the cresylic acid contained 180 g. citric acid, a yield of 23.5% based on glucose supplied. At the same age, the culture which received the 50 p.p.m. cresylic acid contained 505 g. citric acid, a yield of 69% and an increase in citric acid production of 180% due to the added cresylic acid.

*Examples 5–10*

An aqueous sucrose solution was prepared by decationizing a solution of Mexican refined cane sugar and contained 201 grams of sugar per liter, calculated as invert sugar. Six separate media, each of four liters, were prepared from the sucrose solution, five of such media containing, respectively, an aromatic hydroxy compound as an addition agent. The aromatic compounds used and their concentrations are shown in the table below. No aromatic hydroxy compound was added to the remaining medium, which was retained as a control. The operating conditions and the mineral additives in all these media were the same as those in Example 3, except that in the instant examples the pH of the media were initially adjusted to pH 2.86 with ammonium carbonate, the concentration of $Cu^{++}$ and $Zn^{++}$ in the media were 0.1 p.p.m. each, and the yield data were taken at 8 days, 17 hours after inoculation with *Aspergillus niger*. These data, which are given in the following table, clearly show the improvement in yield in citric acid resulting from additions to the respective media of aromatic hydroxy compounds in accordance with the invention.

| Example | Organic compound added | Concentration of organic compound (p.p.m.) | Citric acid produced (grams) |
|---|---|---|---|
| 5 | None | | 226 |
| 6 | 3,4-xylenol | 40 | 450 |
| 7 | 2,6-xylenol | 20 | 513 |
| 8 | 2,5-xylenol | 40 | 511 |
| 9 | p-Cresol | 40 | 492 |
| 10 | m-Cresol | 20 | 480 |

Examples 11–17

The fermentations of Examples 5–10 were repeated, except that different aromatic hydroxy compounds were used as addition agents, the media were prepared from defecated and decationized high-test cane syrup and contained about 204.25 grams per liter of sugar (calculated as invert sugar), and the yields of citric acid produced in the several fermentations were determined after the fermentations had proceeded for 10 days and 20 hours. The data for these examples are summarized in the following table:

| Example | Organic compound added | Concentration of organic compound (p.p.m.) | Citric acid produced (grams) |
|---|---|---|---|
| 11 | None | | 434 |
| 12 | 1-naphthol | 30 | 681 |
| 13 | 2-naphthol | 30 | 668 |
| 14 | Hydroquinone | 60 | 548 |
| 15 | Resorcinol | 30 | 573 |
| 16 | o-Cresol | 60 | 654 |
| 17 | Phenol | 30 | 668 |

Examples 18–19

The procedure of Examples 5–10 was repeated, except that the medium was prepared from decationized high-test syrup and contained 194.8 grams of sugar per liter; salicylic acid was the organic compound used as the addition agent; and the yields of citric acid were determined after the fermentation had progressed 9 days, 16 hours. The data for Examples 18 and 19 are given in the following table:

| Example | Organic compound added | Concentration of organic compound (p.p.m.) | Citric acid produced (grams) |
|---|---|---|---|
| 18 | Control | 0 | 612 |
| 19 | Salicylic acid | 20 | 651 |

Examples 20–22

The procedure of Examples 5–10 was repeated, except that the medium was prepared from decationized high-test syrup and contained 200 grams of sugar per liter; other organic compounds were used as addition agents; and the yields of citric acid were determined after the fermentation had progressed for 6 days, 17 hours. The data for Examples 20–22 are set forth in the following table:

| Example | Organic compound added | Concentration of organic compound (p.p.m.) | Citric acid produced (grams) |
|---|---|---|---|
| 20 | Control | 0 | 203 |
| 21 | 3-hydroxy-2-naphthoic acid | 10 | 651 |
| 22 | 4-methyl-umbelliferone | 40 | 658 |

In all of the above examples, the fermentations reported as controls were operative to produce citric acid in some degree, and the organic compounds introduced into the media as addition agents were effective to improve the yields of such processes. However, the technique of the present invention is also effective in some cases to initiate fermentation in cultures which would otherwise be inactive. Such use of the invention is illustrated below in Examples 23–25.

Examples 23–25

The procedure of Examples 5–10 was repeated, except that the concentration of sugar in the media was 153 grams per liter; no copper or zinc ions were included in the media; other organic compounds were added to the media (except in the control); and the determination of yield of critic acid was made 6 days, 20 hours, after inoculation with spores of *Aspergillus niger*. The data for Examples 23–25 are given below in the following table:

| Example | Organic compound added | Concentration of organic compound (p.p.m.) | Citric acid produced (grams) |
|---|---|---|---|
| 23 | Control | 0 | 0 |
| 24 | 3-hydroxy-2-naphthoic acid | 5 | 429 |
| 25 | 1-naphthol | 15 | 387 |

Examples 26–34

The procedure of Example 3 was followed except that other organic addition agents were used; the copper and zinc salts and cresylic acid were omitted; the sugar concentration was 195.5 grams per liter; and CaCl$_2$ was adde to give 50 p.p.m. calcium ion. The data of these examples are given in the following table:

| Example | Organic compound added | Concentration of organic compound (p.p.m.) | Citric acid produced, g. | Residual sugar, g. | Conversion[1] efficiency, percent |
|---|---|---|---|---|---|
| 26 | None | 0 | 260 | 300 | 45.4 |
| 27 | Isophthalic acid | 50 | 711 | 73 | 84.5 |
| 28 | Phthalic acid | 50 | 720 | 65 | 84.0 |
| 29 | Terephthalic acid | 100 | 735 | 60 | 85.0 |
| 30 | Diphenic acid | 50 | 702 | 81 | 83.6 |
| 31 | Trimesic acid | 40 | 740 | 53 | 85.0 |
| 32 | 2-anthraquinone-carboxylic acid | 50 | 580 | 122 | 73.5 |
| 33 | 1-naphthoic acid | 15 | 549 | 192 | 78.0 |
| 34 | Phenyl acetic acid | 20 | 759 | 47 | 86.5 |

[1] Throughout the specification Conversion Efficiency is calculated by means of the following formula:

$$\frac{215}{180} \times \frac{\text{g. citric acid produced}}{\text{g. sugar destroyed}} \times 100$$

Examples 35–38

The procedure of Example 3 was followed except that copper and zinc salts were omitted, the initial sugar content was 19.69% (w./v.), cresylic acid was omitted, different organic agents were added, and CaCl$_2$ was added to give 50 p.p.m. calcium ion. Data, which is given in the following table, is for 11 days, 22 hours duration of fermentation.

| Example | Organic compound added | Concentration of organic compound (p.p.m.) | Citric acid produced, g. | Residual sugar, g. | Conversion[1] efficiency, percent |
|---|---|---|---|---|---|
| 35 | None | 0 | 396 | 285 | 66 |
| 36 | Benzoic acid | 40 | 568 | 196 | 80 |
| 37 | 2-naphthoic acid | 5 | 600 | 141 | 78 |
| 38 | 2-naphthoic acid | 15 | 672 | 97 | 80 |

Examples 39–41

The procedure of Examples 35–38 was followed, except that the sugar content was 20.0% (w./v.); CuSO$_4$ and ZnSO$_4$ were added initially to give 0.1 p.p.m. each of copper ion and of zinc ion, and different organic agents were added to the medium.

| Example | Organic compound added | Concentration of organic compound (p.p.m.) | Citric acid produced, g. | Residual sugar, g. | Conversion[1] efficiency, percent |
|---|---|---|---|---|---|
| 39 | None | 0 | 162 | 448 | 40 |
| 40 | 4-methyl umbelliferone | 40 | 426 | 226 | 65 |
| 41 | 3-hydroxy-2-naphthoic Acid | 10 | 522 | 228 | 77 |

Data in the last three tables above show that the addition of the toxic organic agent to the media results in an increase in the chemical reaction efficiency of the fermentation. Differences in the reaction efficiencies of the controls are explained on the basis of differing efficiencies in decationizing the syrups, and different crop years supply of high-test syrup.

*Examples 42–45*

The procedure for Examples 26–34 was followed, except that other organic addition agents were used. Data for these examples are shown in the following table:

| Example | Organic compound added | Concentration of organic compound (p.p.m.) | Citric acid produced, g. | Residual sugar, g. | Conversion [1] efficiency, percent |
|---|---|---|---|---|---|
| 42 | None | 0 | 266 | 300 | 45.4 |
| 43 | 1-chloronaphthalene | 50 | 731 | 51 | 89.9 |
| 44 | Bromobenzene | 50 | 690 | 71 | 81.0 |
| 45 | Chlorobenzene | 50 | 720 | 59 | 83.2 |

*Examples 46–48*

The procedure of Example 3 was followed except that each 4-liter culture contained 790 grams sugar supplied as defecated, decationized high-test cane syrup, and 200 milligrams calcium supplied as $CaCl_2$, and copper and zinc ions were not added to the cultures of these examples. Data are given in the following table:

| Example | Organic compound added | Concentration of organic compound (p.p.m.) | Citric acid produced, g. |
|---|---|---|---|
| 46 | None | 0 | 396 |
| 47 | Azocarmine (phenvlrosinduline trisulfonate) | 30 | 540 |
| 48 | Crystal violet (hexamethyl pararosaniline chloride) | 15 | 549 |

*Examples 49 and 50*

The procedure of Examples 26–34 was followed except that 50 p.p.m. of triphenyl methane was used as the organic addition agent, and the yield data were taken at 9 days, 18 hours, after inoculation of the media with spores of *Aspergillus niger*. This fermentation produced 731 grams of citric acid, showing a chemical reaction efficiency of 83.8%, as contrasted with 292 grams citric acid, with a chemical reaction efficiency of 52%, produced by the concurrently run control.

*Examples 51 and 52*

The procedure of Example 3 was followed except that the initial sugar content of a four-liter culture was 815 grams, copper and zinc salts were omitted, and the culture duration was 9 days, 16 hours. Data are given in the following table:

| Example | Additive type | Concentration (p.p.m.) | Citric acid produced, g. |
|---|---|---|---|
| 51 | None | 0 | 315 |
| 52 | p-aminobenzoic acid | 30 | 670 |

*Examples 53–56*

A fermentation medium was prepared using a mixture of sugar sources, approximately equal volumes of acid hydrolyzed hydrol and high-test cane syrup. Hydrol is a byproduct of corn sugar manufacture and is the residual molasses left after recovery of corn sugar. The mixed sugars were defecated and were decationized by passage through a bed of Dowex 50 resin. Nutrients added were 1000 p.p.m., $MgSO_4 \cdot 7H_2O$, 140 p.p.m. $KH_2PO_4$, $ZnSO_4$ to give 0.1 p.p.m. zinc, and ammonium carbonate to give a pH value of 2.86. Each four-liter fermentation contained 800 grams total sugar, calculated as invert. Cultures were maintained for ten days, 15 hours at 86 to 88° F. and aerated with 4 to 6 liters air per minute. Data are given in the following table:

| Example | Organic compound added | Concentration of organic compound (p.p.m.) | Citric acid produced, g. | Yield, percent of theoretical [2] |
|---|---|---|---|---|
| 53 | None | 0 | 341 | 50.5 |
| 54 | Sulfanilamide | 30 | 590 | 66.3 |
| 55 | Pyridine | 60 | 579 | 65.5 |
| 56 | Tribenzylamine | 100 | 624 | 68.5 |

[2] Based on sugar consumed.

*Examples 57–68*

Defecated, decationized high-test cane syrup was adjusted to pH 2.88 with ammonia. Other nutrients added were 1000 p.p.m. $MgSO_4 \cdot 7H_2O$, 140 p.p.m. $KH_2PO_4$, $ZnSO_4$ to give 0.5 p.p.m. zinc. Four-liter fermentations were inoculated with spores of *Aspergillus niger* and held at 86 to 88° F. for 6 days, 17 hours. Air was passed through the cultures at a rate of 7 liters per minute. Each culture contained initially 788 grams sugar. Data are given in the following table:

| Example | Organic compound added | Concentration of organic compound (p.p.m.) | Citric acid produced, g. |
|---|---|---|---|
| 57 | None | 0 | 196 |
| 58 | Dibenzylamine | 100 | 292 |
| 59 | Gentisic acid | 100 | 266 |
| 60 | 2,4-dinitrophenyl hydrazine | 100 | 274 |
| 61 | 1-naphthalene acetic acid | 40 | 287 |
| 62 | Naphthenic acid (cyclohexane-carboxylic acid) | 100 | 342 |
| 63 | Anisaldehyde | 50 | 239 |
| 64 | 1-naphthaldehyde | 50 | 267 |
| 65 | Benzaldehyde | 50 | 220 |
| 66 | Chlorothymol | 50 | 269 |
| 67 | Furfural | 100 | 270 |
| 68 | Methyl Green (heptamethyl-p-rosaniline chloride) | 30 | 461 |

As shown by the foregoing examples, with fermentation media prepared from carbohydrate materials which have been purified by usual purification methods, including decationization, advantageous results in accordance with the present invention may be obtained through the use of relatively small amounts of the toxic organic addition agent—e.g. up to about 100 p.p.m. If decationization of the impure carbohydrate material is omitted it is believed that beneficial results in accordance with the invention may nevertheless be realized if larger amounts of the organic addition agents are used.

Examples 69 and 70, below, illustrate the application of the present process to a fermentation of a medium prepared with an undecationized carbohydrate solution, wherein the carbohydrate is crystalline sucrose.

*Examples 69–70*

Crystalline sucrose was dissolved in tap water, and the following nutrients added: $KH_2PO_4$ 0.015%, $MgSO_4 \cdot 7H_2O$ 0.1%, and $ZnSO_4$ to give 25 p.p.m. zinc ion. The resulting solution was divided into two parts, and to each was added 0.2% $(NH_4)_2CO_3$, then HCl to pH 2.82. The resulting solutions were sterilized in an autoclave for five minutes at 250° F. After cooling, a four-liter portion of each solution was transferred to a separate Pyrex glass pipe 3″ x 48″, equipped with air inlet at the bottom, and air outlet at the top. The solutions were aerated at the rate of 6 to 7 liters per minute during the first 24 hours, and 7 to 8 liters per minute thereafter. The solutions were inoculated with spores of *Aspergillus niger* immediately after the initial aeration commenced. Sterile antifoaming agent Hodag ML4, was added as needed to control foaming. The temperature was 88 to 92° F. Analysis of solutions at the time of inoculation showed the presence of sucrose equivalent to 19.55% invert sugar.

To one culture was added initially, very soon after inoculation (e.g., between about 0.5 and 1.0 minute) 15 p.p.m. 3-hydroxy-2-naphthoic acid, and between two days, seventeen hours and two days, nineteen hours age there was added 25 p.p.m. more 3-hydroxy-2 naphthoic acid. The data for these fermentations are shown in the following table:

| Example | 3-hydroxy-2 naphthoic acid added, p.p.m. | Acidity at 6 days 17 hours, grams per culture [1] | Residual sugar, grams per culture | Sugar consumed, grams per culture [2] | Equivalent citric acid grams, per culture | Yield percent of theory [3] |
|---|---|---|---|---|---|---|
| 69 | 0 | 4 | 478 | 304 | 355 | 1 |
| 70 | 40 | 237 | 352 | 430 | 502 | 48 |

[1] Corrected for initial acidity and for sampling. This figure is actually the increase in citric acid calculated as monohydrate per four liter culture.
[2] Invert sugar.
[3] One mole hexose yields, one mole citric acid.

Hodag ML4 is a trade name for a partially refined tall oil marketed by Hodag Corporation, Rhinelander, Wisconsin. Other antifoaming agents, such as silicones, polyglycols, lard-oil, etc. may be used and are functionally effective in our process. However, we prefer to use tall oil as the antifoaming agent since its use satisfies religious dietary laws and other regulations for products going into the food industry.

The foregoing examples illustrate the broad scope of the invention whereby organic compounds toxic towards the fermentation organism may be used to improve citric acid production, the examples specifically disclosing a large number of compounds representative of the many classes of organic compounds having utility in the present process.

It will be understood that the foregoing description is merely illustrative of the invention, and that various changes in the procedures, compositions, percentages, conditions and other factors set forth may be made without departing from the spirit of the invention as defined in the appended claims.

What is claimed is:
1. In the production of citric acid by fermentation with *Aspergillus niger*, in submerged culture, of a medium prepared with organic nutrient derived from an impure carbohydrate source, said nutrient including impurities in an amount effective normally to promote, during fermentation, a cellular metabolism of said *Aspergillus niger* producing of at least some mycelium of inferior citric acid-producing capacity, the method of promoting a cellular metabolism of the *Aspergillus niger* favoring the production of efficient citric acid-producing mycelium which comprises incorporating in said medium an organic agent which is toxic toward said *Aspergillus niger* by interfering with the activity of at least one of the respiratory enzymes of the cells of the organism, said agent being used in an amount effective to overcome at least partially said effect of said impurities on said *Aspergillus niger* but in sub-lethal concentration, the entire amount of said agent being incorporated in said medium prior to the expiration of the initial growth period of said *Aspergillus niger*, said toxic organic agent being selected from the class consisting of cresylic acid, 3,4-xylenol, 2,6-xylenol, 2,5-xylenol, p-cresol, m-cresol, o-cresol, 1-naphthol, 2-naphthol, hydroquinone, resorcinol, phenol, salicylic acid, 3-hydroxy-2-naphthoic acid, 4-methylumbelliferone, isophthalic acid, phthalic acid, terephthalic acid, diphenic acid, trimesic acid, 2-anthraquinone-carboxylic acid, 1-naphthoic acid, 2-naphthoic acid, phenyl acetic acid, benzoic acid, 1-chloronaphthalene, bromobenzene, chlorobenzene, phenylrosinduline trisulfonate, hexamethyl pararosaniline chloride, p-aminobenzoic acid, sulfanilamide, pyridine, tribenzylamine, dibenzylamine, gentisic acid, 2,4-dintrophenyl hydrazine, 1-naphthalene acetic acid, cyclohexane-carboxylic acid, anisaldehyde, 1-naphthaldehyde, benzaldehyde, chlorothymol, heptamethyl-p-rosaniline chloride and triphenyl methane.

2. The method in accordance with claim 1, wherein at least a portion of said agent is incorporated into said medium prior to inoculation of the medium with spores of said *Aspergillus niger*.

3. The method in accordance with claim 1, wherein at least a portion of said agent is incorporated into said medium at the time of inoculation of the medium with spores of said *Aspergillus niger*.

4. The method in accordance with claim 1, wherein said agent is 3-hydroxy-2-naphthoic acid.

5. The method in accordance with claim 1, wherein said agent is 4-methyl umbelliferone.

6. The method in accordance with claim 1, wherein said agent is 1-naphthol.

7. The method in accordance with claim 1, wherein said agent is 2-naphthol.

8. The method in accordance with claim 1, wherein said agent is 2,6-xylenol.

References Cited by the Examiner
UNITED STATES PATENTS
2,970,084  1/61  Schweiger _____ 195—36

OTHER REFERENCES
Usami et al.: Kogyo Kagaku Zasshi 64, 2072 (1961). Abstracted in C.A. 57, 3873 (1962).

A. LOUIS MONACELL, *Primary Examiner.*

UNITED STATES PATENT OFFICE
CERTIFICATE OF CORRECTION

Patent No. 3,189,527　　　　　　　　　　　　　　　　　June 15, 1965

Lewis Byford Lockwood et al.

It is hereby certified that error appears in the above numbered patent requiring correction and that the said Letters Patent should read as corrected below.

Column 1, line 28, for "of" read -- in --; column 3, line 34, for '"Dominno"' read -- "Domino" --; line 67, for "Examples" read -- Example --; column 4, line 41, for "fermentation" read -- fermentations --; line 65, for "to", second occurrence, read -- of --; column 6, line 49, for "imprities" read -- impurities --; column 10, line 19, for "addde" read -- added --; same line 19, for "of" read -- for --; column 14, line 25, for "2,4-dintrophenyl" read -- 2,4-dinitrophenyl --.

Signed and sealed this 15th day of February 1966.

(SEAL)
Attest:

ERNEST W. SWIDER　　　　　　　　　　　　　　　　EDWARD J. BRENNER
Attesting Officer　　　　　　　　　　　　　　　　Commissioner of Patents